United States Patent
Wu

(10) Patent No.: US 11,655,322 B2
(45) Date of Patent: *May 23, 2023

(54) MULTIPHASE EMULSION POLYMERS FOR AQUEOUS COATING COMPOSITIONS CONTAINING LITTLE OR NO ORGANIC SOLVENTS

(71) Applicant: Arkema Inc., King of Prussia, PA (US)

(72) Inventor: Wenjun Wu, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/376,713

(22) PCT Filed: Feb. 5, 2013

(86) PCT No.: PCT/US2013/024701
§ 371 (c)(1),
(2) Date: Aug. 5, 2014

(87) PCT Pub. No.: WO2013/119524
PCT Pub. Date: Aug. 15, 2013

(65) Prior Publication Data
US 2015/0031830 A1    Jan. 29, 2015

Related U.S. Application Data

(60) Provisional application No. 61/597,455, filed on Feb. 10, 2012.

(51) Int. Cl.
| | | |
|---|---|---|
| *C08F 265/02* | (2006.01) | |
| *C09D 151/00* | (2006.01) | |
| *C08L 33/12* | (2006.01) | |
| *C08F 265/06* | (2006.01) | |
| *C08L 33/14* | (2006.01) | |
| *C09D 133/12* | (2006.01) | |
| *C09D 133/14* | (2006.01) | |

(52) U.S. Cl.
CPC .......... *C08F 265/02* (2013.01); *C08F 265/06* (2013.01); *C08L 33/12* (2013.01); *C08L 33/14* (2013.01); *C09D 133/12* (2013.01); *C09D 133/14* (2013.01); *C09D 151/003* (2013.01); *C08L 2205/02* (2013.01); *C08L 2207/02* (2013.01)

(58) Field of Classification Search
CPC ........ C08F 265/06; C08F 2/22; C08F 265/02; C08F 220/14; C08L 51/003; C08L 33/12; C08L 33/14; C08L 2205/02; C08L 2207/02; C09D 151/003; C09D 133/12; C09D 133/14
See application file for complete search history.

(56) References Cited

U.S. PATENT DOCUMENTS

| | | | |
|---|---|---|---|
| 4,150,005 A * | 4/1979 | Gehman et al. | 524/533 |
| 6,410,655 B2 | 6/2002 | Okubo et al. | |
| 6,465,562 B1 | 10/2002 | Charmot et al. | |
| 6,524,656 B2 | 2/2003 | Even et al. | |
| 7,332,046 B2 | 2/2008 | Eubanks et al. | |
| 2004/0221395 A1* | 11/2004 | Biver et al. | 8/94.15 |
| 2005/0027079 A1 | 2/2005 | Palmer Lauer et al. | |
| 2005/0107527 A1* | 5/2005 | Holub et al. | 524/817 |
| 2009/0306297 A1* | 12/2009 | Destarac et al. | 525/205 |
| 2010/0255329 A1* | 10/2010 | Couvreur | 428/511 |
| 2010/0330286 A1* | 12/2010 | Wu et al. | 427/385.5 |
| 2012/0121903 A1* | 5/2012 | Betremieux et al. | 428/375 |
| 2012/0129974 A1 | 5/2012 | DeNotta et al. | |
| 2015/0031830 A1* | 1/2015 | Wu | 524/745 |
| 2015/0051334 A1* | 2/2015 | Wu et al. | 524/533 |
| 2015/0073080 A1* | 3/2015 | Wu et al. | 524/369 |

FOREIGN PATENT DOCUMENTS

| | | |
|---|---|---|
| CN | 102321326 A | 1/2012 |
| EP | 0 609 756 A2 | 8/1994 |
| EP | 1 106 660 B1 | 4/2010 |
| WO | WO 2005/054384 A1 | 6/2005 |
| WO | WO 2011/009560 * | 1/2011 |

OTHER PUBLICATIONS

Thermal Transitions of Homopolymers:Glass Transition and Melting Point. No Author, No Date. Obtained from https://www.sigmaaldrich.com/technical-documents/articles/materials-science/polymer-science/thermal-transitions-of-homopolymers.html on Nov. 19, 2018.*

W.A. Lee Royal Aircraft Establishment; Farnborough, Hants England; and R.A. Rutherford Rubber and Plastics Research Association of Great Britain, Shawbury, Shrewsbury, England "The Glass Transition Temperatures of Polymer" 1975; pp. 139-191.

* cited by examiner

*Primary Examiner* — Jessica M Roswell
(74) *Attorney, Agent, or Firm* — Lynn B. Morreale

(57) ABSTRACT

A multiphase emulsion polymer for aqueous coating compositions containing little or no organic solvent includes at least one soft phase and at least one hard phase prepared by a multi-stage emulsion polymerization. The hard phase contains a hard phase polymer having a glass transition temperature in a range from 10 C to 100 C which is more than 50 C higher than that of the soft phase polymer. The hard phase is formed as a first stage polymer and the one soft phase is subsequently polymerized in the presence of the first stage polymer. The hard phase polymer includes at least one carboxylic acid monomer and at least one ethylenically unsaturated monomer. A method of making a multiphase emulsion polymer for aqueous coating compositions containing zero or low levels of organic solvent is disclosed. Such aqueous coating compositions may simultaneously have excellent block resistance, freeze thaw stability and low temperature coalescence characteristics.

12 Claims, No Drawings

MULTIPHASE EMULSION POLYMERS FOR AQUEOUS COATING COMPOSITIONS CONTAINING LITTLE OR NO ORGANIC SOLVENTS

CROSS-REFERENCE TO RELATED APPLICATIONS

This application is a national stage application under 35 U.S.C. § 371 of PCT/US2013/24701, filed Feb. 5, 2013, which claims benefit to U.S. patent application 61/597,455 filed on Feb. 10, 2012.

FIELD OF THE INVENTION

The present invention relates to multiphase emulsion polymers for aqueous coating compositions which are free or substantially free of organic solvents and volatile organic compounds and which have excellent block resistance, freezing-thawing stability and low temperature coalescence, as well as to methods of preparing such aqueous coating compositions containing little or no organic solvent.

BACKGROUND OF THE INVENTION

The major components of aqueous coating compositions such as latex paints are binder and water, in addition to pigment. The binder is a polymer, in the form of latex particles, that forms a polymer film after drying and determines the film formation mechanism depending on its chemistry. Water is present as a consequence of the emulsion polymerization process used in preparing the binder, and provides liquidity and spreadability.

Water-based latex paints must have film-forming properties at the temperatures of paint drying, thus, the glass transition temperature, Tg, must be very low (i.e., minimum film forming temperature). A low Tg is, however, disadvantageous in the long run because the paint would not acquire its hardness and protective properties and would remain tacky and tend to have poor block resistance. This requires that the polymer should have a low glass transition temperature, Tg, during its cure and a higher Tg in its operating lifetime. Different methods can be used to achieve this but the use of coalescing solvents is the most popular method. In general, a coalescing solvent is used to temporarily lower the glass transition temperature, Tg, and helps in film formation. Once the coalescing solvent is evaporated, the Tg increases resulting in a continuous latex paint coating. Coalescing solvents, however, are the most significant contributor to volatile organic compounds (VOCs) in water-based coatings. Although the VOC content of latex paints is usually lower than that of solvent-based paints, there is increasing pressure to reduce VOC content further.

In addition to the coalescing solvents, freeze/thaw additives are also included in the coating compositions to improve freeze/thaw performance of the coating compositions. Conventional freeze/thaw additives that are used in conjunction with the volatile coalescing solvents include relatively low molecular weight compounds such as alcohols, glycols and the like. The conventional freeze/thaw additives, like the volatile coalescing solvents, are also classified as VOCs that are harmful to the environment.

As such, there is a demand for aqueous coating compositions that can be formulated with zero to low levels of volatile freeze-thaw additives and coalescing solvents, and that are capable of maintaining excellent block resistance, freeze-thaw stability and low temperature coalescence simultaneously.

SUMMARY OF THE INVENTION

The present invention relates to a multiphase emulsion polymer (typically obtained in the form of a polymer latex binder containing, in addition to the multiphase emulsion polymer in the form of stabilized latex particles, water and emulsifier) that is advantageous for use in formulating aqueous coating compositions which contain little or no organic solvent and thus can have an advantageously low VOC content.

The multiphase polymer of the present invention includes at least one soft polymer phase (sometimes referred to herein as a "soft phase") and at least one hard polymer phase (sometimes referred to herein as a "hard phase"). The multiphase emulsion polymer may be prepared by a multistage emulsion polymerization. The at least one hard polymer phase comprises a hard phase polymer having a glass transition temperature in a range from 10° C. to 100° C. which is more than 25° C. (or more than 30° C. or more than 35° C. or more than 40° C. higher or more than 50° C. higher) than that of the at least one soft phase polymer. The at least one hard polymer phase is formed as a first stage polymer and the at least one soft polymer phase is subsequently polymerized in the presence of the first stage polymer. The at least one hard polymer phase includes a copolymer of at least one carboxylic acid monomer and at least one ethylenically unsaturated monomer.

In one particular aspect, a multiphase emulsion polymer is provided which comprises:

at least one soft polymer phase comprised of a soft phase polymer which is a copolymer of C1-C4 alkyl(meth) acrylates having a Tg of from −70° C. to 0° C. and at least one hard polymer phase comprised of a hard phase polymer and prepared by a multi-stage emulsion polymerization, wherein the hard phase polymer has a glass transition temperature of from 10° C. to 100° C. which is more than 50° C. higher than that of the soft phase polymer and represents at least 25% of the total weight of the multiphase emulsion polymer, the at least one hard polymer phase is formed as a first stage polymer and the at least one soft polymer phase is subsequently polymerized in the presence of the first stage polymer, and the hard phase polymer is a copolymer of methacrylic acid, one or more C1-C4 alkyl(meth)acrylates, and at least one wet adhesion monomer. A polymer latex binder containing the multiphase emulsion polymer may have a minimum film formation temperature (MFFT) of less than 15° C., more preferably less than 12° C.

The present invention also provides a method of making a multiphase emulsion polymer for aqueous coating compositions containing little or no organic solvent. The method comprises:

(a) copolymerizing an aqueous emulsion of at least one ethylenically unsaturated monomer and at least one carboxylic acid monomer to form a hard phase polymer having a glass transition temperature of from 10° C. to 100° C.; and (b) polymerizing one or more additional monomers in the presence of the hard phase polymer to form a soft phase polymer;

wherein the glass transition temperature of the hard phase polymer is more than 25° C. higher or more than 50° C. higher than that of the at least one soft phase polymer.

The invention also provides a polymer latex binder useful in a zero or low VOC latex coating composition, comprising the aforementioned multiphase emulsion polymer in the form of latex particles, water, and at least one emulsifier. Also provided by the invention is a latex coating composition comprising the polymer latex binder and at least one pigment.

DETAILED DESCRIPTION OF THE INVENTION

The multiphase emulsion polymers of the polymer latex binder for aqueous coating compositions containing little or no organic solvent, according to the present invention, may be characterized as polymers having at least one soft (low Tg) polymer phase (domain) and at least one hard (high Tg) polymer phase (domain), which may be prepared via a multi-stage emulsion polymerization in which subsequent stage polymerizations occur in the presence of the first and successive stage polymers. Emulsion polymerization is a free radical polymerization performed in a heterogeneous reaction system, yielding submicron solid polymer particles dispersed in an aqueous medium.

As measured by standard differential scanning calorimetric methods, the hard phase polymer of the present invention has a glass transition temperature Tg, ranging from 10° C. to 100° C. (or, in other embodiments, from 10° C. to 90° C. or 20° C. to 100° C.) which is more than 25° C. (or more than 30° C., 35° C., 40° C., 45° C. or 50° C.) higher than that of the soft polymer phase. The soft polymer phase may, for example, have a Tg in the range of 0 to −70° C. or −5 to −55° C. In one embodiment of the invention, the difference in the Tg values of the hard and soft polymer phases will be within the range of 30 to 110° C. All Tg values and ranges are inclusive. A latex of the multiphase emulsion polymer may exhibit a minimum film forming temperature (MFFT) of less than 15° C. or less than 12° C. MFFT can be analyzed on a rectangular temperature gradient bar. The MFFT is determined at the point where the latex forms a clear and un-cracked dry film. Temperature was measured by a hand-held thermocouple placed on the dry film. The soft polymer phase may be present as an inner phase of the multistage emulsion polymer particles and the hard polymer phase may be present as an outer phase of the multistage emulsion polymer particles.

The hard polymer phase and soft polymer phase of the present invention may be prepared by using monomers in such combinations as to satisfy the above Tg and MFFT values. It is appropriate, however, to select monomers to be used in such a manner as to make the Tg value difference between the hard and soft polymer phases more than 25° C. or more than 50° C., and to provide a polymer latex binder including different phase structure emulsion particles, in which the lowest Tg value of any polymer present is lower than a lowest Tg value of a polymer obtained by uniformly emulsion-polymerizing total monomers for the hard and soft phase polymers at one stage.

The multiphase emulsion polymer of the present invention includes one or more hard polymer phases and one or more soft polymer phases prepared by a multi-stage emulsion polymerization. The hard polymer phase is formed as a first stage polymer and the monomer or monomer mixture used to form the soft polymer phase is subsequently polymerized in the presence of the first stage polymer.

The hard polymer phase may represent greater than 20% by weight of the total polymer present in the multiphase emulsion polymer particles. The hard polymer phase may represent from 25% to 40% by weight, or from 25% to 35% by weight, of the total polymer present in the multiphase emulsion polymer particles. The soft polymer phase may represent less than 80% by weight of the total polymer present in the multiphase emulsion polymer particles. The soft polymer phase may, for example, represent from 60% to 75% by weight, or from 65% to 75% by weight, of the total polymer present. All percentages by weight, including ranges, are inclusive. In one embodiment, the total of the weight % of the soft phase polymer and the weight % of the hard phase polymer is 100%.

The hard polymer phase comprises a copolymer of one or more carboxylic acid monomers and at least one additional monomer which is a vinyl- or (meth)acrylic-containing monomer or other type of polymerizable ethylenically unsaturated monomer. The soft phase polymer may be prepared either as a homopolymer or as a copolymer from one or more ethylenically unsaturated monomers such as vinyl- or (meth)acrylic-containing monomers. The particular choice of monomers for either phase will depend, among other considerations, on the desired Tg value for the phase. The glass transition temperatures, Tg, of the polymer phases can be calculated using the Fox equation:

$$1/Tg(polymer) = W(a)/Tg(a) + W(b)/Tg(b) + \ldots,$$

where W(a) and W(b) are the weight fractions of comonomers (a) and (b) and Tg(a) and Tg(b) are the glass transition temperatures for homopolymers (a) and (b), respectively. Glass transition temperatures for various homopolymers are available in many literature sources, including J. Brandup and E. H. Immergut, Polymer Handbook, 2nd ed., John Wiley & Sons, New York, pp 139-192 (1975).

Suitable examples of ethylenically unsaturated monomers include vinyl- and (meth)acrylic-containing monomers such as the alkyl esters (in particular, the C1-C18 alkyl esters, where the alkyl group is linear or branched) of acrylic and methacrylic acid such as methyl(meth)acrylate, ethyl(meth)acrylate, n-propyl(meth)acrylate, isopropyl(meth)acrylate, n-butyl(meth)acrylate, isobutyl(meth)acrylate, pentyl(meth)acrylate, 2-ethylhexyl(meth)acrylate, decyl(meth)acrylate, dodecyl(meth)acrylate, and stearyl(meth)acrylate; halo- and hydroxyl-substituted alkyl esters of (meth)acrylic acid such as α-chloroethyl(meth)acrylate, 2-hydroxyethyl(meth)acrylate, 2- and 3-hydroxypropyl(meth)acrylate, and 4-hydroxybutyl(meth)acrylate; vinyl esters of linear and branched carboxylic acids having 1 to 25 carbon atoms, preferably 2 to 20 carbon atoms, such as vinyl acetate, vinyl propionate, vinyl butyrate, vinyl valerate, vinyl 2-ethylhexylacrylate, vinyl isononanoate, vinyl laurate, vinyl stearate, vinyl versatate; styrene and styrene derivatives, such as alpha-methylstyrene, 2-chlorostyrene, 4-chlorostyrene, 2,5-dichlorostyrene and 4-methoxystyrene; as well as polymerizable unsaturated carboxylic acids such as unsaturated C3-C6 monocarboxylic acids, e.g., methacrylic acid, acrylic acid, and crotonic acid, monoesters of unsaturated C4-C6 dicarboxylic acids such as mono-methylmaleate and mono-ethylmaleate, and unsaturated C4-C6 dicarboxylic acids, such as fumaric acid, maleic acid, and itaconic acid. Other examples of suitable monomers include (meth)acrylonitrile; cycloalkyl(meth)acrylates such as cyclohexyl(meth)acrylate; aryl and alkaryl esters of (meth)acrylic acid such as phenyl(meth)acrylate; acetoacetate moiety containing monomers such as 2-acetoacetoxyethyl(meth)acrylate, 3-acetoacetoxypropyl(meth)acrylate, 4-acetoacetoxybutyl(meth)

acrylate, 2-cyanoacetoxyethyl(meth)acrylate, 3-cyanoacetoxypropyl(meth)acrylate, 4-cyanoacetoxybutyl(meth)acrylate, N-(2-acetoacetoxyethyl)(meth)acrylamide, allyl acetoacetate, 2,3-di(acetoacetoxy)propyl(meth)acrylate, and vinyl acetoacetate; amide group-containing monomers such as (meth)acrylamide, diacetone acrylamide and maleinamide; epoxy group-containing monomers such as glycidyl (meth)acrylate and allylglycidyl ether; vinyl chloride; olefins such as ethylene; dienes such as butadiene, and the like.

As described above, these monomers may be used in such a combination as to provide a multiphase emulsion polymer wherein the soft polymer phase has a Tg value more than 25° C. or more than 50° C. lower than that of the hard polymer phase and a latex of the multiphase emulsion polymer has an MEFT value of less than 15° C. or less than 12° C.

One or more of the above-mentioned monomers may be copolymerized with one or more carboxylic acid monomers in such a combination as to provide the hard polymer phase having a Tg value of from 10 to 100° C. and more than 25° C. higher (or more than 50° C. higher) than that of the soft polymer phase.

Examples of suitable carboxylic acid monomers useful in the present invention are the C3-C6 monocarboxylic acids, such as methacrylic acid, acrylic acid, and crotonic acid, mono-esters of C4-C6 dicarboxylic acids such as mono-methylmaleate and mono-ethylmaleate, and C4-C6 dicarboxylic acids, such as fumaric acid, maleic acid, and itaconic acid. Other ethylenically unsaturated monomers bearing one or more carboxylic acid groups per molecule and capable of being emulsion polymerized may also be used. Typically, the hard phase polymer contains at least 0.5% by weight carboxylic acid monomer. For example, the carboxylic acid monomer content of the hard phase polymer may be from 1 to 12% by weight or 2 to 10% by weight.

The carboxylic acid monomer may be neutralized with a neutralizing agent such as ammonia, dimethylethanolamine or triethanolamine or may be present in free acid form. Similarly, the soft phase polymer which is produced therefrom may contain carboxylic acid functional groups pendant to the polymer backbone which are in free acid and/or salt (neutralized) form.

In order to enhance the wet adhesion of the ultimate aqueous (latex) coating composition, either one or the other, or both the soft and hard phase polymers, may comprise a wet adhesion monomer, or a combination of wet adhesion monomers. These monomers are well known in the art and include polymerizable amino-, urea- and ureido-functionalized ethylenically unsaturated monomers such as aminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl)acrylamide and methacrylamide, N-(3-dimethylamino-2,2-dimethylpropyl)acrylamide and methacrylamide, N-dimethylaminomethyl acrylamide and methacrylamide, N-dimethylaminomethyl acrylamide and methacrylamide, N-(4-morpholino-methyl)acrylamide and methacrylamide, vinylimidazole, vinylpyrrolidone, N-(2-methacryloyloxyethyl)ethylene urea, N-(2-methacryloxyacetamidoethyl)-N,N'-ethyleneurea, allylalkyl ethylene urea, N-methacrylamidomethyl urea, N-methacryoyl urea, N-[3-(1,3-diazacyclohexan)-2-on-propyl]methyacrylamide, 2-(1-imidazolyl)ethyl methacrylate, 2-(1-imidazolidin-2-on)ethylmethacrylate, N-(methacrylamido)ethyl ethylene urea (Sipomer® WAM II, Rhodia) and allyl ureido wet adhesion monomer (Sipomer® WAM, Rhodia). The wet adhesion monomers may, for example, be present in the soft or hard phase polymer in an amount from 1% to 15.0% by weight of the total polymer.

To reduce mixing between the two polymer phases and improve the block resistance of the paint formulations, either or both of the polymers constituting the phases may comprise a low level of a multifunctional crosslinking monomer having two or more polymerizable carbon-carbon double bonds per molecule, such as vinyl or allyl acrylate or methacrylate, divinyl benzene, diallyl maleate, multifunctional acrylates and methacrylates (i.e., compounds containing two or more (meth)acryl functional groups per molecule), and methylene-bis-acrylamide. The multifunctional monomer may, for example, be present in an amount from 0.01% to 5% by weight of the total polymer.

When either or both of the polymers constituting the phases comprise one or more carbonyl-containing monomers (such as a monomer bearing an acetoacetate functionality), crosslinking reactions involving these monomers may be achieved by adding carbonyl-reactive crosslinking agents or compounds to the polymer. Examples of carbonyl-reactive compounds include polyfunctional amines, hydrazine, alkyl dihydrazines, alkylene dioxime ethers, and dihydrazides of dicarboxylic acids.

In one embodiment of the present invention, the copolymer present in the hard polymer phase is a copolymer of one or more alkyl(meth)acrylates (e.g., a mixture of butyl acrylate (BA) and methyl methacrylate(MMA)), methacrylic acid (MAA), and a wet adhesion monomer such as hydroxyethyl ethylene urea methacrylate (HEEUMA), with the relative proportions being selected so as to provide a glass transition temperature Tg within the range of from 10° C. to 100° C. which is more than 25° C. higher or more than 50° C. higher than the Tg of the soft polymer phase and an MFFT (for an aqueous latex of the multiphase emulsion polymer) of less than 15° C. or less than 12° C. For example, the copolymer may be a copolymer of 10-30% by weight butyl acrylate, 60-80% by weight methyl methacrylate, 2-10% by weight methacrylic acid, and 4-12% by weight wet adhesion monomer, the total equaling 100%.

In another embodiment, the polymer present in the soft phase is a copolymer of butyl acrylate and methyl methacrylate, with the relative proportions of these monomers being selected so as to provide a Tg of less than 0° C. For example, the copolymer may be a copolymer of 20-70% by weight butyl acrylate and 30-80% by weight methyl methacrylate, the total equaling 100%.

In yet another embodiment, the soft phase polymer is substantially free (e.g., contains less than 0.1% by weight) or is entirely free of any oxyalkylene-containing monomers such as polyethylene glycol(meth)acrylates, polypropylene glycol(meth)acrylates, and ethers and phosphate esters thereof.

Chain transfer agents including mercaptans, polymercaptans, alcohols, and halogen compounds are sometimes used in the polymerization mixture in order to moderate the molecular weight of the polymer. Chain transfer agents may be used in any stage of the multistage polymerization.

Typically, the multiphase emulsion polymer is obtained in the form of fine particles. The size of the multiphase emulsion polymer particles can vary. However, in various desirable embodiments of the present invention, the particles have an average diameter of less than 200 nm, or less than 175 nm, or less than 150 nm, or less than 100 nm. The monomers for the hard polymer phase are emulsion polymerized to an average particle size of (for example) 25-150 nm, after which the monomer charge for the soft polymer phase is introduced into the polymerization medium and polymerized in the presence of the first polymer phase particles to the desired average final particle size, e.g., less than 200 nm or less than 100 nm. In one desirable embodiment of the present invention, the monomers used to prepare the hard phase polymer are polymerized first, followed by polymerization of the monomer or monomers to be incorporated into the soft phase polymer. As is well known in the art, control of latex particle size can be accomplished by a variety of techniques, any of which may be applied to the multi-stage polymerization of this invention. Volume-averaged particle size is determined using a Nanotrac UPA 150 from Microtrac Inc.

The multi-stage emulsion polymerization is carried out by at least 2 stages, usually from 2 to 5 stages of emulsion polymerization of one or more ethylenically unsaturated monomers in water in accordance with well-known emulsion polymerization techniques, and the resulting emulsion polymer thus formed constitutes different phase structure emulsion particles comprising a plurality of phases having different Tg values, including at least one soft polymer phase and at least one hard polymer phase.

The polymerization of the first phase (hard polymer phase) polymer can be accomplished by known procedures for polymerization in aqueous emulsion. The monomer or comonomers to be employed in the preparation of the hard polymer phase particles are dispersed into water with agitation sufficient to emulsify the mixture. The aqueous medium may also contain a free radical polymerization catalyst, an emulsifying agent (i.e., surfactant), or other ingredients that are known and conventionally employed in the art as emulsion polymerization aids.

Catalysts which may be used to cause free radical polymerization include thermal initiators and redox initiator systems composed of an oxidizing agent and a reducing agent. Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization. As a general rule, a catalytic amount ranges from about 0.01% to 5% by weight based upon the total monomers to be polymerized. As alternatives to heat or catalytic compounds to activate the polymerization, other free radical producing means, such as exposure to activating radiation, can be employed.

Suitable emulsifying agents include anionic, cationic, and nonionic emulsifiers customarily used in emulsion polymerization. Usually, at least one anionic emulsifier is utilized and one or more nonionic emulsifiers may also be utilized. Representative anionic emulsifiers are the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide desired particle size and particle size distribution.

Other ingredients known in the art to be useful for various specific purposes in emulsion polymerization, such as bases, acids, salts, buffering agents, chain transfer agents, and chelating agents, can also be employed in the preparation of the polymer. In one embodiment of the invention, where the first stage forms the hard phase polymer and the second stage forms the soft phase polymer, the second stage polymerization may be carried out following neutralization of the first phase by a base such as sodium hydroxide, potassium hydroxide, ammonium hydroxide, sodium carbonate, or sodium bicarbonate.

The monomers in each stage of the multi-stage polymerization may be added neat or as an emulsion in water. The manner of combining the polymerization ingredients can be by various known monomer feed methods, such as continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization to form the first polymer phase particles is generally initiated by heating the emulsified mixture with continued agitation to a temperature usually between 50 and 110° C., or between 60 and 100° C., or between 80 and 90° C. Polymerization is continued by maintaining the emulsified mixture at the selected temperature until the desired degree of conversion of the monomer or monomers to polymer has been reached.

Following the polymerization to form the hard polymer phase (first phase) polymer particles, the latex may be filtered to remove any precoagulum and then stabilized for storage (pending subsequent use as the dispersed hard polymer phase particles in the second stage polymerization) by the addition of a small amount of known stabilizer surfactant. In one embodiment, the filtering and intermediate stabilization steps for the first polymer latex are eliminated by proceeding directly to the polymerization of the monomers for the second polymer phase. The monomers for the second polymer phase (soft polymer phase) are dispersed with agitation into the aqueous medium containing the first polymer phase particles and polymerized with continued agitation in generally the same manner and with the same optional polymerization aids as described for the preparation of the first polymer phase particles. The second polymer phase monomers may be pre-emulsified in water before being combined with the aqueous medium containing the first polymer phase particles. Additional quantities of one or more free radical polymerization catalysts may be added at the same time the monomers for the second polymer phase are introduced. Heating is carried out for a time effective to achieve the desired extent of monomer conversion of the second polymer phase.

Following polymerization, the solids content of the resulting aqueous heterogeneous polymer latex can be adjusted to the level desired by the addition of water or by the removal of water by distillation. Generally, the desired level of polymeric solids content is from about 20%-65% or from about 45%-60% by weight on a total weight basis. In one embodiment, the solids content of the resulting polymer latex binder may be around 50%.

Suitable particle sizes can generally be achieved directly from the polymerization, as described above. However, screening of the resulting latex to remove particles outside the desired size range and to thus narrow the particle size distribution may be employed. Other techniques such as high shear mixing, grinding, milling, homogenization, and the like may also be employed to modify the particle size or particle size distribution, if so desired.

The polymer emulsion thereby obtained is useful as a binder component in formulating latex coating compositions such as paints and the like. Typically, the polymer emulsion is utilized in a latex (aqueous) coating composition in an amount of from 5 to 90% by weight. The content of multiphase emulsion polymer in a latex (aqueous) coating composition (calculated on a dry solids basis) typically is from 20 to 75% by weight.

The latex coating composition may include at least one pigment. The term "pigment" as used herein includes non-film-forming solids such as pigments, extenders, and fillers. The at least one pigment may, for example, be selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Typically, the at least one pigment includes at least one of $TiO_2$, $CaCO_3$ or clay. Generally, the mean particle sizes of the pigments may range from about 0.01 to about 50 microns. For example, $TiO_2$ particles used in the latex coating composition may have a mean particle size of from about 0.15 to about 0.40 microns. The pigment can be added to the latex coating composition as a powder or in slurry form. The pigment is typically present in the final formulated coating composition in an amount from about 5% to about 50% by weight, more typically from about 10% to about 40% by weight.

For various applications, the coating composition can contain conventional coating additives, for example, dispersants, additional surfactants (i.e. wetting agents), thickeners, biocides, mildewcides, bactericides, colorants such as colored pigments and dyes, antifoamers, rheology modifiers, waxes, perfumes, pH adjustment agents (e.g., acids, bases, buffers), UV ray absorbers, photostabilizers and the like, incorporated in the latex coating composition. This may be done in a conventional manner and at any convenient point in the preparation of the latex coating compositions. These additives are typically present in the latex coating composition in an amount from 0 to about 15% by weight, more typically from about 1 to about 10% by weight, based on the total weight of the coating composition.

The latex coating compositions of the present invention are, in one embodiment, substantially free of freeze-thaw additives. Accordingly, the aqueous coating compositions of the present invention may, in one aspect, be free of freeze-thaw additives, which reduces the VOC content of the composition. The aqueous coating composition of the present invention may be formulated to have a VOC level of less than about 100 g/L or less than 50 g/L or even 0 g/L. Despite the low VOC content, the aqueous coating composition is capable of simultaneously exhibiting excellent block resistance, freeze thaw stability and low temperature coalescence properties.

The latex coating compositions according to one embodiment of the present invention contain substantially no organic solvents. The balance of the latex coating composition, other than the non-volatile components such as the multiphase emulsion polymer and pigment, may be water. Although much of the water is present in the polymer latex binder and in other components of the aqueous coating composition, water is generally also added separately to the latex coating composition. Typically, the latex coating composition includes from about 10% to about 85% by weight and more typically from about 35% to about 80% by weight water. Stated differently, the total solids content of the latex coating composition is typically from about 15% to about 90%, more typically, from about 20% to about 65%.

The coating compositions are typically formulated such that the dried coatings comprise at least 10% by volume of dry polymer solids, and additionally 5% to 90% by volume of non-polymeric solids in the form of pigments. The coating compositions contain different phase structure emulsion particles obtained by the above-mentioned multi-stage emulsion polymerization method as a latex binder, and this latex binder may be used in a dispersion (emulsion) state in water as a clear paint or as a pigmented paint, but in order to impart various functions to a paint, it is preferable to incorporate various additives such as dispersants, additional surfactants (i.e. wetting agents), thickeners, biocides, mildewcides, bactericides, colorants such as colored pigments and dyes, antifoamers, rheology modifiers, waxes, perfumes, pH adjustment agents (e.g., acids, bases), UV ray absorbers, photostabilizers and the like, that do not evaporate upon drying of the coating composition.

The latex coating compositions of the present invention are typically in the form of stable fluids that can be applied to a wide variety of materials such as, for example, metal, wood, paper, cardboard, composites, plastics, concrete, glass, ceramics, plaster, dry wall, other coatings, cloth, foams, and the like, and provides an excellent coating film by air-drying or force-drying at a temperature of at most 100° C. The substrate may have been previously painted, primed, undercoated, sanded, conversion coated, oxidized, chemically treated, etched, or the like. The coating composition may be applied to the material or substrate by any suitable method such as, for example, dipping, brushing, spraying, roller coating, knife coating, or the like. Typically, a thin uniform layer (film) of the coating composition is formed on the substrate surface and then dried to form a dry coating. Drying may be accelerated by heating, if so desired. Multiple dry coating layers may be formed by applying successive layers of the coating composition. The latex binders of the present invention are suitable for use in a wide range of both interior and exterior zero to low VOC paints from gloss to flat.

The coating compositions of the present invention may also be readily adapted for use in pressure sensitive adhesives, caulks and sealants, in addition to paints.

EXAMPLES

MFFT measurement using ASTM D2354-10: The minimum film formation temperature (MFFT) of example latexes was analyzed on a rectangular temperature gradient bar. The MFFT was determined at the point where the latex formed a clear and uncracked dry film.

The following methods were used to characterize the coating compositions (paints) prepared in accordance with the examples.

Block Resistance: The test paints were prepared on Leneta 1B opacity charts using a 3-mil bird drawdown bar. The films for room temperature (RT) block were dried in a constant temperature and humidity environmental chamber for 1 day. Two square strips measuring 2.54 cm×2.54 cm were placed together with paint film against paint film under a 454-gram weight. After 24 hours, the strips were separated and evaluated according to ASTM D-4946 ratings. For the elevated temperature (ET) block test, the paint strips after 1-day drying at CT/CH were placed in a 120° F. oven for 30 minutes. The weight load of 1000 grams was transferred to the paint films via a 2.54 cm diameter rubber stopper. The films were allowed to cool for 30 minutes before the block ratings were given. Room and elevated temperature block were rated on the ASTM D-4946 scale from 0 (worst) to 10 (best). The test was run in triplicate and the average value was reported.

Freeze-thaw stability was measured using a modified ASTM D2243-82 procedure: 1) Fill half pint cans with two thirds full paint; Measure and record initial KU viscosity; 2) Cans are placed in a freezer at 0° F. for 16 to 18 hours and then thawed at room temperature for 24 hours; KU viscosity is measured if the paints appear to be fluid; 3) Step 2 and 3 are repeated 5 times or the paint is coagulated irreversibly.

Low temperature coalescence (LTC) tests were run at 40° F. The drawdown films were prepared on Leneta 1B Opacity Charts using 10-mil bird applicator for LTC and 25-mil square bar for mud cracking tests, respectively. The paint films were placed in a 40° F. refrigerator immediately after the films were drawn down and allowed to dry for 24 hours. The dried films were examined for continuity. The degree of cracking on the sealed and unsealed portions was rated on a 1 to 5 scale, as follows.

1=severe cracking
2=moderate cracking
3=some cracking
4=slight cracking
5=no cracking Polymer latex binders containing multiphase emulsion polymers were prepared as follows:

Comparative Example CE1

Not in Accordance with the Invention 450 parts of deionized water, 1.8 parts of sodium carbonate, and 39.4 parts of sodium lauryl sulfate (SLS, 30% in water) were charged into a reactor equipped with a stirrer, reflux condensers, thermocouples, and stainless steel feed lines. When the reactor was heated to 85° C., 2.8 parts of sodium persulfate solution in 35.0 parts water were added thereto. The pre-emulsified monomer mixture A (hard polymer phase) consisting of 220 parts water, 7.9 parts SLS, 121.4 parts butyl acrylate (BA), 132.4 parts methyl methacrylate (MMA), 18.0 parts methacrylic acid (MAA), and 24.0 parts hydroxyethyl ethylene urea methacrylate (HEEUMA, 50% in water) was pre-emulsified by stirred in a separate container was added continuously to the reactor for 1 hour. After 10 minutes of starting monomer mixture A feed, the addition of a sodium carbonate (5.1 parts) solution was begun, 16.3% of which was fed over 50 minutes and the remainder added over 5 minutes. The first stage content was then held at 87° C. for 15 minutes. At the end of hold, the pre-emulsified monomer mixture B (soft polymer phase) consisting of 123.0 parts water, 500.4 parts BA, 387.0 parts MMA, and 4.0 parts SLS was polymerized at 80° C. in the presence of first stage composition. 2.8 parts of sodium persulfate solution was added simultaneously for 150 minutes. The reactor contents were then held at 80° C. for 30 minutes. To reduce the residual monomer concentrations, 0.9 parts of tertiary butyl hydroperoxide (tBHP) and 1.4 parts of sodium metabisulfite (SMBS) were fed over 30 minutes at 80° C. The solids content of the latex was ~50% and average particle size was 74 nm.

Comparative Example CE2

Comparative Example CE2 was prepared following the same procedure described in Comparative Example CE1 except for different BA/MMA ratios in the monomer mixtures A and B. The resulting latex had a solids content of ~51% and an average particle size of 106 nm.

Comparative Examples CE3 and CE4

Comparative Examples CE3 and CE4 were prepared following the same procedure described in Comparative Example CE1 except for different BA/MMA ratios in the monomer mixtures A and B. The properties of the resulting latexes are given in Table 1.

Examples E1 and E2

Examples E1 and E2 (in accordance with the present invention) were prepared following the same procedure described in Comparative Example CE1 except for different BA/MMA ratios in the monomer mixtures A and B. The properties of the resulting latexes are given in Table 1.

TABLE 1

Compositions and Properties of Example Polymer Latex Binders Containing Multiphase Emulsion Polymers

| Latex composition | | CE1 | CE2 | CE3 | CE4 | E1 | E2 |
|---|---|---|---|---|---|---|---|
| Monomer Mixture A | wt % (hard polymer phase) | 25 | 20 | 50 | 35 | 25 | 25 |
| | BA/MMA | 42.8/46.7 | 13.1/74.2 | 41.2/53.7 | 25.3/67.4 | 12.5/76.9 | 26.3/63.1 |
| Monomer Mixture B | BA/MMA | 56.4/43.6 | 67.9/32.1 | 56.4/43.6 | 62.8/38.0 | 67.9/32.1 | 62.0/38.0 |
| ΔTg (hard polymer phase-soft polymer phase) | ΔTg (° C.) | 25 | 100 | 25 | 62.5 | 100 | 62.5 |
| Solids content | % | 50.3 | 50.5 | 50.6 | 50.4 | 50.0 | 50.6 |
| Particle size | Mv (nm) | 74 | 106 | 85 | 91 | 68 | 74 |
| MEET | ° C. | 6.0 | 0 | 17.5 | 17.9 | 11.1 | 3.8 |

Preparation of Coating Compositions

The grind substances listed in Table 2 were ground for 30 to 45 minutes in a high speed COWLES mixer. The letdown substances were then blended with the grind substances using an overhead mixer to form the coating compositions.

TABLE 2

Example of Solvent-free Paint Composition (paint formulation)

| Ingredient | Density lbs/gallon | Mass (lbs) | Vol (Gallons) |
|---|---|---|---|
| Common Grind | | | |
| Water | 8.33 | 32.0 | 3.8 |
| Proxel ® GXL preservative | 9.4129 | 1.5 | 0.2 |
| BYK ® 025 defoamer | 8.34 | 0.5 | 0.1 |
| Tamol ® 1124 dispersant | 9.9 | 20.0 | 2.0 |
| Ammonia (28%) | 7.7 | 4.0 | 0.5 |
| Ti-Pure ® R-706 ® TiO2 | 33.3 | 210.0 | 6.3 |
| Water | 8.33 | 50.0 | 6.0 |
| Total Grind | | 318.0 | 18.9 |
| Letdown | | | |
| Polymer Latex Binder | 8.85 | 580.0 | 65.5 |
| BYK ® 025 defoamer | 8.34 | 2.0 | 0.2 |
| Rheolate ® 278 thickener | 8.58 | 4.5 | 0.5 |
| Water | 8.33 | 124.0 | 14.9 |
| Total Paint | | 1028.5 | 100.1 |

TABLE 3

Paint properties of Example Polymer Latex Binders

| | | CE1 | CE2 | CE3 | CE4 | E1 | E2 |
|---|---|---|---|---|---|---|---|
| Low Temperature Coalescence scale 1 ~ 5, 5 = best | sealed | 5 | 5 | 1 | 1 | 5 | 5 |
| | unsealed | 5 | 5 | 1 | 1 | 5 | 5 |
| Initial KU Viscosity | KU | 121 | 117 | 113 | 104 | 109 | 106 |
| Freeze thaw | FT cycles | Failed after 1 cycle | | 5 | 5 | 5 | 5 |
| | KU change after 5 FT cycles | | | 8 | 4 | 8 | 2 |
| Block Resistance | 1 day, RT | 8 | 9 | 10 | 9 | 9 | 7 |
| | 1 day, ET | 6 | 8 | 7 | 7 | 8 | 7 |

What is claimed is:

1. A polymer latex binder having a VOC level of less than about 50 g/L comprising a multiphase emulsion polymer in the form of latex particles, water and at least one emulsifier, said multiphase emulsion polymer comprising:
   at least one soft polymer phase having a glass transition temperature of from 0 to −70° C. comprised of a soft phase polymer and at least one hard polymer phase comprised of a hard phase polymer, said multiphase emulsion polymer prepared by a multi-stage emulsion polymerization,
       wherein the hard phase polymer has a glass transition temperature of from 10° C. to 100° C. which is more than 50° C. higher than that of the soft phase polymer,
       wherein said multi-stage emulsion polymerization comprises the steps of forming the at least one hard polymer phase as a first stage polymer, and subsequently polymerizing the at least one soft polymer phase in the presence of the first stage polymer, and
       wherein the hard phase polymer comprises: (i) copolymer of at least one C1-C4 alkyl (meth)acrylate, methacrylic acid and at least one wet adhesion monomer, or (ii) copolymer of butyl acrylate, methyl methacrylate, methacrylic acid and at least one of hydroxyethyl ethylene urea methacrylate and diacetone acrylamide,
       wherein the soft polymer phase represents from 65% to 75% by weight of the multiphase emulsion polymer and the hard polymer phase represents from 25% to 35% by weight of the multiphase emulsion polymer, the total weight amount of soft polymer phase and hard polymer phase equaling 100%,
       wherein the soft phase polymer is a homopolymer or copolymer formed from one or more monomers selected from the group consisting of methyl (meth)acrylate, ethyl(meth)acrylate, butyl(meth)acrylate, 2-ethylhexyl(meth)acrylate, and diacetone acrylamide,
       wherein the multiphase emulsion polymer is in the form of latex particles, and
       wherein the latex particles comprise an outer phase comprising the hard polymer phase and an inner phase comprising the soft polymer phase and have an average particle size less than 150 nm, and
   the polymer latex binder has a minimum film forming temperature of less than 15° C.

2. The latex polymer binder of claim 1, wherein the copolymer of the hard phase is comprised of 1 to 12% by weight of the methacrylic acid.

3. The latex polymer binder of claim 1, wherein the hard phase polymer is a copolymer of at least one C1-C4 alkyl (meth)acrylate, methacrylic acid and at least one wet adhesion monomer.

4. The latex polymer binder of claim 1, wherein either the hard phase polymer or the soft phase polymer or both further comprises a multifunctional crosslinking unsaturated monomer.

5. The latex polymer binder of claim 1, wherein the hard polymer phase comprises a copolymer of butyl acrylate, methyl methacrylate, methacrylic acid and at least one of hydroxyethyl ethylene urea methacrylate and diacetone acrylamide.

6. The latex polymer binder of claim 1, wherein the soft polymer phase comprises a copolymer of butyl acrylate and methyl methacrylate.

7. A latex coating composition, comprising the polymer latex binder of claim 1 and at least one pigment.

8. A method of making a polymer latex binder having a VOC level of less than about 50 g/L, comprising:
   (a) copolymerizing an aqueous emulsion of (i) at least one C1-C4 alkyl (meth)acrylate, methacrylic acid and at least one wet adhesion monomer, or (ii) butyl acrylate, methyl methacrylate, methacrylic acid and at least one of hydroxyethyl ethylene urea methacrylate and diacetone acrylamide,
       to form a hard phase polymer having a glass transition temperature of from 10° C. to 100° C.,
   (b) then polymerizing one or more additional monomers in the presence of the hard phase polymer to form a soft phase polymer having a glass transition temperature of from 0 to −70° C.;
       wherein the glass transition temperature of the hard phase polymer is more than 50° C. higher than that of the at least one soft phase polymer,
   wherein the soft phase polymer is a homopolymer or copolymer formed from one or more monomers selected from the group consisting of methyl (meth)
acrylate, ethyl acrylate, butyl(meth)acrylate, 2-ethyl-
hexylacrylate, and diacetone acrylamide,
wherein the soft phase polymer represents from 65% to
75% by weight of the multiphase emulsion polymer
and the hard phase polymer represents from 25% to
35% by weight of the multiphase emulsion polymer,
the total weight amount of soft phase and hard phase
polymer equaling 100%,
wherein the polymer latex binder is in the form of latex
particles, and
wherein the latex particles comprise an outer phase com-
prising the hard polymer phase and an inner phase
comprising the soft polymer phase and have an average
particle size less than 150 nm.

9. The method of claim 8, wherein the copolymer of the hard phase polymer is comprised of 1 to 12% by weight of the methacrylic acid.

10. The method of claim 8, wherein the hard phase polymer is a copolymer of butyl acrylate, methyl methacrylate, methacrylic acid and at least one of hydroxyethyl ethylene urea methacrylate and diacetone acrylamide.

11. The method of claim 8, wherein either the hard phase polymer or the soft phase polymer or both further comprise a multifunctional crosslinking unsaturated monomer.

12. The method of claim 8, wherein the soft phase polymer is a copolymer of butyl acrylate and methyl methacrylate.

* * * * *